United States Patent [19]

Meyer et al.

[11] Patent Number: 4,950,121

[45] Date of Patent: Aug. 21, 1990

[54] UNIVERSAL METHOD AND APPARATUS FOR ATTACHING AN AIRCRAFT TUG TO AN AIRPLANE

[75] Inventors: Ronald A. Meyer, Dexter; Neil D. Gerl, Ann Arbor, both of Mich.

[73] Assignee: Aeromover Systems Inc., Dexter, Mich.

[21] Appl. No.: 301,331

[22] Filed: Jan. 25, 1989

[51] Int. Cl.$^5$ .............................................. B60P 3/06
[52] U.S. Cl. .................................. 414/428; 180/14.7; 180/904; 244/50; 414/429
[58] Field of Search ................. 244/50; 180/14.7, 904; 414/426–430; 410/30, 42, 49

[56] References Cited

U.S. PATENT DOCUMENTS

| | | | |
|---|---|---|---|
| 2,852,151 | 9/1958 | Smith | 414/428 |
| 2,877,912 | 3/1959 | Giacomo | 414/428 |
| 3,828,953 | 8/1974 | Reznicek | 414/428 |
| 4,225,279 | 9/1980 | Boyer | 414/428 |
| 4,375,244 | 3/1983 | Morin | 180/14.7 |
| 4,596,506 | 6/1986 | Burgardt et al. | 414/429 |
| 4,632,625 | 12/1986 | Schuller et al. | 180/904 |
| 4,810,157 | 3/1989 | Schopf | 414/429 |

FOREIGN PATENT DOCUMENTS

| | | | |
|---|---|---|---|
| 52-29017 | 4/1977 | Japan | 180/904 |
| 57-70741 | 5/1982 | Japan | 180/904 |

OTHER PUBLICATIONS

Boden-Personal, Lastauto Omnibus, 12/1985, pp. 40–41.
"An Aircraft Tug which Revolutionises Ground Handling", Aircraft Engineering, Jun., 1985, p. 21.
"Moving Small Aircraft", Aircraft Engineering, Aug., 1985, p. 24.

*Primary Examiner*—Galen Barefoot
*Attorney, Agent, or Firm*—Rohm & Monsanto

[57] ABSTRACT

A novel approach is employed for attaching an aircraft tug to the nosewheel tire assembly of an airplane. A tire capturing mechanism comprising a pivoting capture arm and a transversally adjustable crossbar opens to allow positioning of the capturing mechanism around and beneath the portion of said tire that is not in contact with the runway surface. After tire capture is accomplished, said capturing mechanism is elevated off the runway surface by a lifting mechanism, so that the entire portion of the weight of said airplane supported by said tire is borne by said aircraft tug. A universal tire clamping mechanism is employed to secure said tire firmly to said capturing mechanism.

12 Claims, 4 Drawing Sheets

PRIOR ART ITEM

UNIVERSAL METHOD AND APPARATUS FOR ATTACHING AN AIRCRAFT TUG TO AN AIRPLANE

BACKGROUND OF THE INVENTION

This invention relates to aircraft tugs, and more particularly to a novel method and apparatus for attaching an aircraft tug to the nosewheel tire of an airplane.

An aircraft tug is a machine used to move an airplane about a runway without the assistance of the airplane's engines. A standard aircraft tug, such as the Ingersoll-Rand "Paymover" tractor, attaches to an airplane via a towing bar that is connected to the airplane's nosewheel assembly at one end of the towing bar and to the tug at the other end of the towing bar as shown in FIG. 1. The connection at the tug end of the towing bar is usually a universal joint, so as to allow for convenient maneuvering of the airplane by the tug. The connection between the towing bar and the airplane is normally a firm connection to the axle of the nosewheel of the airplane, so that the nosewheel rotates in conjunction with lateral movement of the towing bar. With this standard tug arrangement, the traction necessary to tow the airplane must be supplied entirely by the weight of the tug itself. Conventional tugs, used to maneuver large airplanes such as a Boeing 747 Jetliner, must therefore weigh in excess of twenty-five tons to have adequate traction to function properly.

A newer approach for overcoming the problem of excessive tug weight has been developed by Air Traction Industries, Ltd. of England and described in the article entitled "An Aircraft Tug Which Revolutionizes Ground Handling" which appeared in *Aircraft Engineering*, page 21, June, 1985. The tug described therein is designated by the company as its ASSET TM tug.

The ASSET tug includes a lifting system which locates on the nosewheel jacking point and provides for lifting the nosewheel and tire assembly onto a turntable where it is then firmly secured. This system allows the nosewheel to remain in a locked position during relocation of the airplane by the ASSET tug. The ASSET tug has the disadvantage of requiring specialized adapters for different airplane makes and models. These adapters take time, effort, and manpower to install for each use of the tug, and are prone to being misplaced or lost.

To the best knowledge and belief of the inventors of the instant invention, there are no methods or apparatus disclosed in the aircraft tug prior art which include a capability for capturing, lifting, and maneuvering an airplane by its nosewheel and tire assembly without specialized adapters for different types of airplanes.

It is therefore an object of this invention to provide a universal method and apparatus for attaching an aircraft tug to the front wheel and tire assembly of an airplane in a way that allows the tug to use part of the weight of the airplane for traction purposes without any need for specialized adapters for various airplanes.

It is another object of this invention to make the attachment process for connecting an aircraft tug to an airplane a relatively simple, efficient, one-person operation that is both economical and safe.

It is yet another object of this invention to provide an aircraft tug with an adjustable airplane tire capturing and lifting apparatus that is capable of accomodating airplane nosewheel and tire assemblies of widely different size and shape.

These and other objects of the invention will become clear to the reader upon careful perusal of the following summary and descriptions.

SUMMARY OF THE INVENTION

In accordance with the present invention, an aircraft tug is universally adapted to capture, lift, and secure the nosewheel and tire assembly of an airplane directly, thus eliminating the need for the use of specialized apparatus such as specific towbars or adapters for different types of airplanes, while concurrently making use of a part of the airplane's own weight to provide the tug with adequate traction to move the airplane.

A tire capturing mechanism, comprising a crossbar (one embodiment of which may be made transversally adjustable for accomodating different tire sizes) and a lockable pivoting capture arm, is positioned athwart the frame of the tug's lifting mechanism. The capturing mechanism is located near the middle of the tug so that when the mechanism is elevated the portion of the airplane's weight bearing on the nosewheel will be shared by all the wheels of the tug.

In order to attach the tug to the airplane for movement, the pivoting capture arm is rotated about its pivot point at one internal side of the tug so that the tug may be moved up to and around the nosewheel and tire assembly of the airplane. The tug is maneuvered so that the crossbar, which is at or near runway level, touches the airplane's front tire at its front lower portion just adjacent to the front of the section of the tire that touches the parking or runway surface. The capture arm is then pivoted so that it is parallel with the crossbar at approximately the same vertical level, but is situated behind the airplane's front tire at its rear lower portion just adjacent the rear of the section of the tire that touches the parking or runway surface. The capture arm is then locked in place.

Once the front tire is captured and locked in by the capture arm, the entire tire capturing mechanism is elevated well above the runway surface by a hydraulic lifting mechanism. This causes the entire portion of the airplane's weight that is supported by its nosewheel tire assembly to be applied to the wheels of the tug, thus greatly increasing the tug's traction capability.

A universal tire clamping mechanism, comprising two adjustable-length arms extending one from each side of the tug frame, is then used to secure the front tire and wheel assembly firmly down against the crossbar and the capture arm.

Upon being thus secured to the tug, the airplane's nosewheel and tire assembly is released to pivot freely so that the airplane can then be conveniently transported about the airfield by the tug. Upon accomplishment of the desired relocation of the airplane, the tug is disconnected from the airplane by going through the above-recited procedure in reverse order.

In one preferred embodiment of the invention, the mechanisms discussed above are hydraulically or electromechanically actuated so that they can be controlled by a single tug operator while sitting in the tug driver's seat. This arrangement improves the convenience, safety, and efficiency of the entire airplane moving operation.

DETAILED DESCRIPTION OF THE INVENTION

Figure 1:
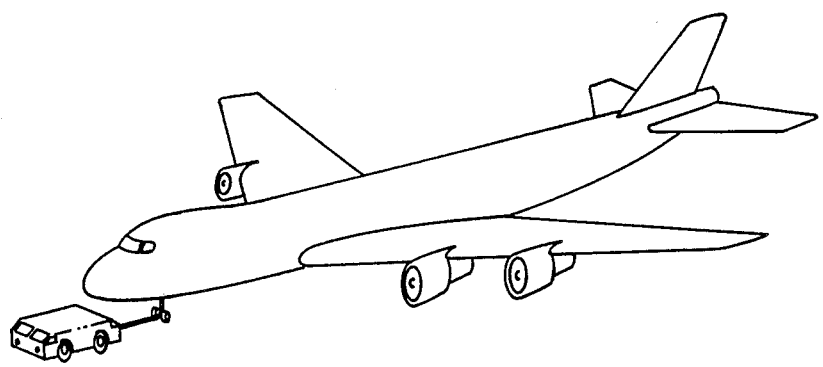
FIG. 1 shows an aircraft tug of the prior art using a tow bar to connect to the nosewheel assembly of an airplane.
Figure 2:
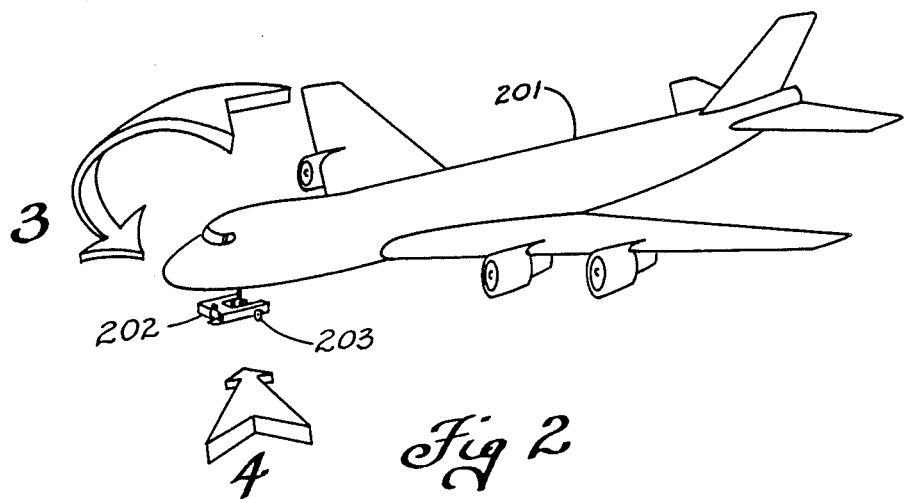
FIG. 2 is a perspective view of a tug employing the apparatus of the instant invention to attach to and move an airplane.
Figure 3:
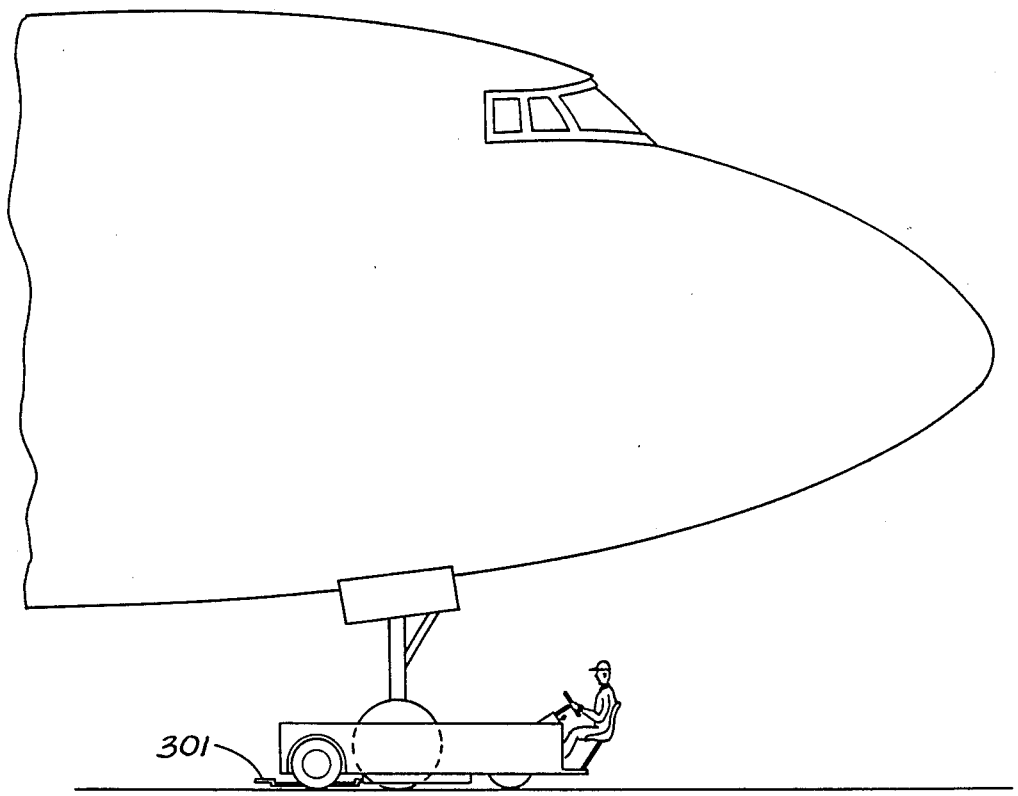
FIG. 3 depicts an airplane being captured by a tug apparatus in accordance with the instant invention.

FIG. 2 shows a preferred embodiment of the invention being used to transport an airplane 201. A U-shaped aircraft tug 202, preferably having four separate drive wheels 203, simultaneously employs the combined capturing, locking, lifting, and clamping mechanisms of the invention. FIG. 3 shows another view with the capture arm 301 not yet engaged.

Figure 4:
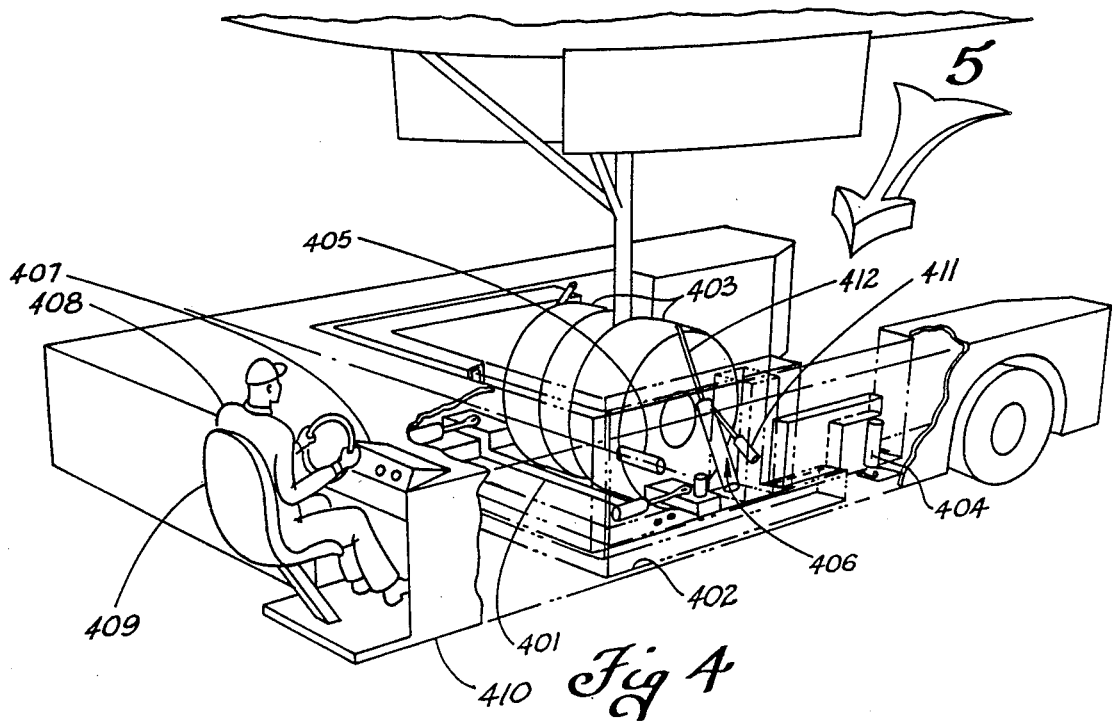
FIG. 4 shows a close-up cutaway perspective view of an airplane tug in accordance with the instant invention, including a tire-clamping mechanism.

In FIG. 4, crossbar 401 and the capture arm (not visible in this view) are mounted athwart the lifting mechanism frame 402 under the portions of the airplane's front tires 403 that do not touch the runway. The capture arm is secured in place by a locking mechanism (not visible in this view). Lifting mechanism frame 402 is elevated by hydraulic actuators 404. Frame 402 pivots on pivot pins 405. Tires 403 are secured in place by dual clamping mechanism 406.

All of the above-described mechanisms are controlled by standard hydraulic and electromechanical controls mounted on control panel 407. The tug operator 408, a person of skill and distinction, runs the entire system from elevated seat 409 so that all the critical apparatus may be easily viewed while in use.

Figure 6:
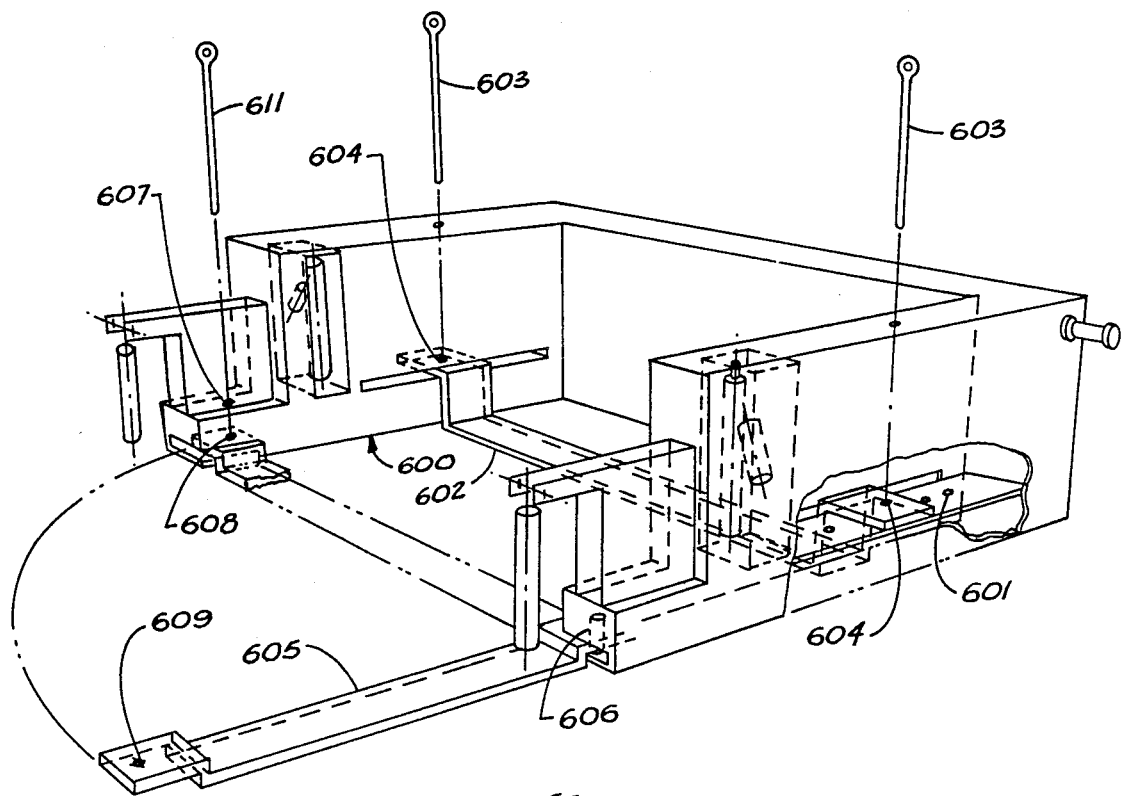
FIG. 6 shows a manually locked and pinned hydraulic lifting mechanism as per the instant invention.

FIG. 6 depicts a detailed view of an alternative manual capturing apparatus according to the invention. Lifting mechanism frame 600 is drilled with holes 601, so that crossbar 602 may be positioned at a variety of locations atop and perpendicularly athwart frame 600 by means of adjusting pins 603 inserted through drilled holes 604 in crossbar 602 and holes 601. Capture arm 605 manually pivots about pivot pin 606, and can be manually secured in place by means of locking pin 607 which is inserted through drilled holes 607 and 608 in frame 600 and locking hole 609 drilled thru the end of capture arm 605 as shown. By manually adjusting and locking the capturing apparatus shown in FIG. 6, the tug operator can make the apparatus suitable for use with a wide variety of different-sized airplane nosewheel and tire assemblies.

Figure 5:
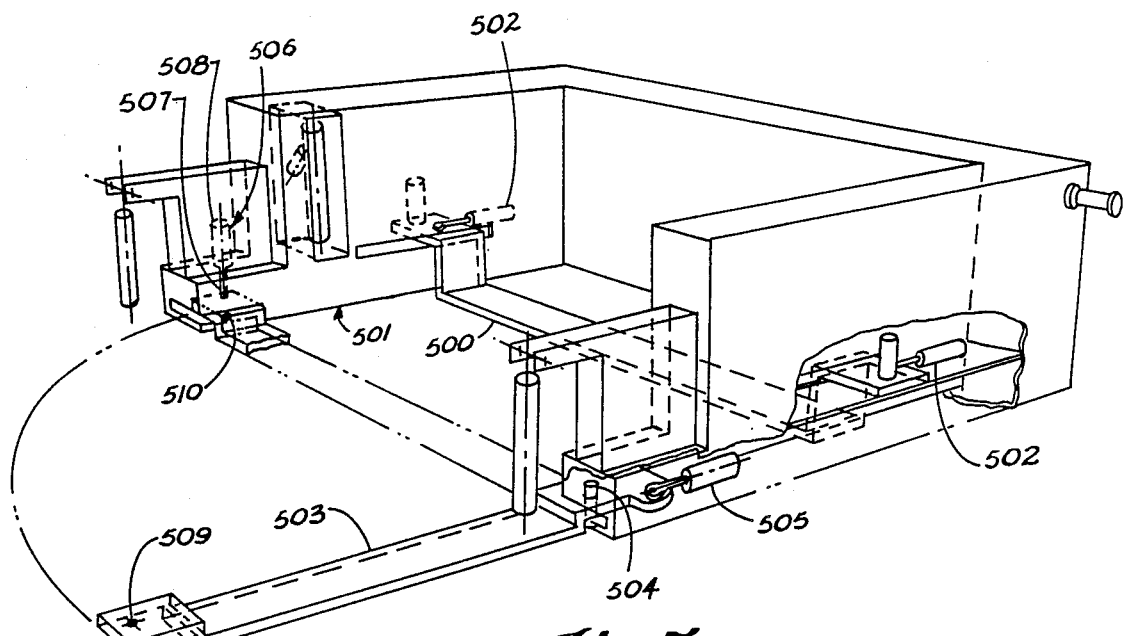
FIG. 5 depicts an alternative hydraulically operated capturing apparatus as per the instant invention which also employs an electromechanically actuated pin lock.

FIG. 5 details a capturing apparatus which is hydraulically and electromechanically controlled. Crossbar 500 lies atop and perpendicularly athwart lifting mechanism frame 501, and may be positioned forward or backward by means of hydraulic crossbar actuators 502 which are fixedly mounted onto frame 501. Capture arm 503 pivots about pivot pin 504. Capture arm 503 is positioned by means of hydraulic capture arm actuator 505 which is pivotably mounted onto frame 501. Upon being pivoted into a closed position by actuator 505, capture arm 503 may be secured into place by means of electromechanical locking mechanism 506. Locking mechanism 506 comprises a normally-down spring-actuated locking pin 507 which may be lifted by electrically energizing solenoid 508 for the purpose of accomodating capture arm 503. Once capture arm 503 is moved into its closed position, the power to solenoid 508 is turned off and locking pin 507 springs into a locked position through hole 509 in capture arm 503 and hole 510 in frame 501. Actuators 502 and 505 and solenoid 508 described above are well known in the hydraulic and electromechanical arts respectively. Typical examples of these devices are as follows: (502)-Texas Hydraulics Catalogue No. TK3005516S1; (505)-Texas Hydraulics Catalogue No. TK2015516C1; (508)-United Technologies Automotive Catalogue No. MV4R300023A12LA.

By controlling the mechanisms shown in FIG. 6 by switches and controls located at the tug operator's control panel, an operator need not leave the operator's seat while accomplishing the entire airplane nosewheel and tire assembly capturing process.

FIG. 4 illustrates the hydraulically-driven lifting mechanism of the invention. The lifting mechanism frame 402 is transversed by crossbar 401 and a capture arm (not shown). Frame 402 is connected to the tug chassis. At one end, frame 402 is connected to chassis 410 via pivot pins 405; at the other end, frame 402 is connected to chassis 410 by hydraulic lifters 404 which are actuated by means of hydraulic pressure lines which are controlled by standard hydraulic pumps and controllers located in the body and control panel of the tug. These lifters 404, pumps, and controllers are all well known in the hydraulic arts. Typical examples of these devices are: (404)-Texas Hydraulics Catalogue No. TK3012024C1; (pumps)-Eaton Model No. 76PV-BP3; (controllers)-United Technologies Automotive Catalogue Series No. MVR3000QX.

Once an airplane nosewheel and tire assembly has been captured by crossbar 401 and the capture arm, lifters 404 are actuated simultaneously in order to lift frame 402, along with the airplane's tires that are positioned above crossbar 401 and the capture arm. As lifters 404 extend, frame 402 pivots about pivot pins 405 so that a vertical and small rotational movement of frame 402 occurs. Once adequate lifting has occurred (usually less than one vertical foot), the hydraulic system that controls lifters 404 is locked in place by standard hydraulic locking apparatus.

The lifting mechanism frame 402, crossbar 401, and the capture arm are fashioned out of steel members and are designed to be adequately strong to carry the nosewheel bearing weight of the heaviest airplane type desired to be moved. These design strength considerations are well known and understood in the mechanical arts. An excellent reference book relating thereto is *Mechanics of Materials*, by E. P. Popov, Prentice-Hall, 1952.

FIG. 4 also shows the details of the tire clamping apparatus in accordance with the invention. The left and right hydraulic clamping mechanisms 406 are housed within lifting mechanism frame 402. Each mechanism comprises two hydraulic actuators: Positioner 411, and extender 412. The actuators are fixedly attached to frame 402 by pivot joints, and are connected together as shown via pivot joint. All the pivot joints are designed to allow for rotation of the clamping mechanism only in a plane that is perpendicular to the longitudinal centerline of frame 402. Actuators 411 and 412 are operated via hydraulic pressure lines that are controlled by hydraulic switches located at the tug's control panel. Extender 412 includes an extension rod which is capable of being pushed out of extender 412 as shown. Actuators 411 and 412 are readily-available off-the-shelf hydraulic parts such as: (411)-Texas Hydraulics Catalogue No. TK3007432C1; (412)-Texas Hydraulics Catalogue No. TK3018932C1.

In operation, positioner 411 is first actuated to push the top end of extender 412 out and away from its recessed housing within lifting mechanism frame 402. Once the top of extender 412 has been extended beyond frame 402 by positioner 411, extender 412 is actuated to cause its extension rod to extend out of the end of extender 412 a sufficient distance to reach just over the top of airplane tire 403 as shown. Upon accomplishment of adequate extension for the particular airplane tire being clamped, extender 412 is then rotated further by positioner 411 until the extension rod presses firmly against tire 403 as shown.

By following the above-stated procedure for both the left and right clamping mechanisms, the tug operator is able to securely clamp the airplane nosewheel and tire assembly down against the crossbar 401 and capture arm so that the airplane's nosewheel and tire assembly is firmly attached to the tug in a manner that is suitable for subsequent transportation of the airplane by the tug.

Figure 7A:
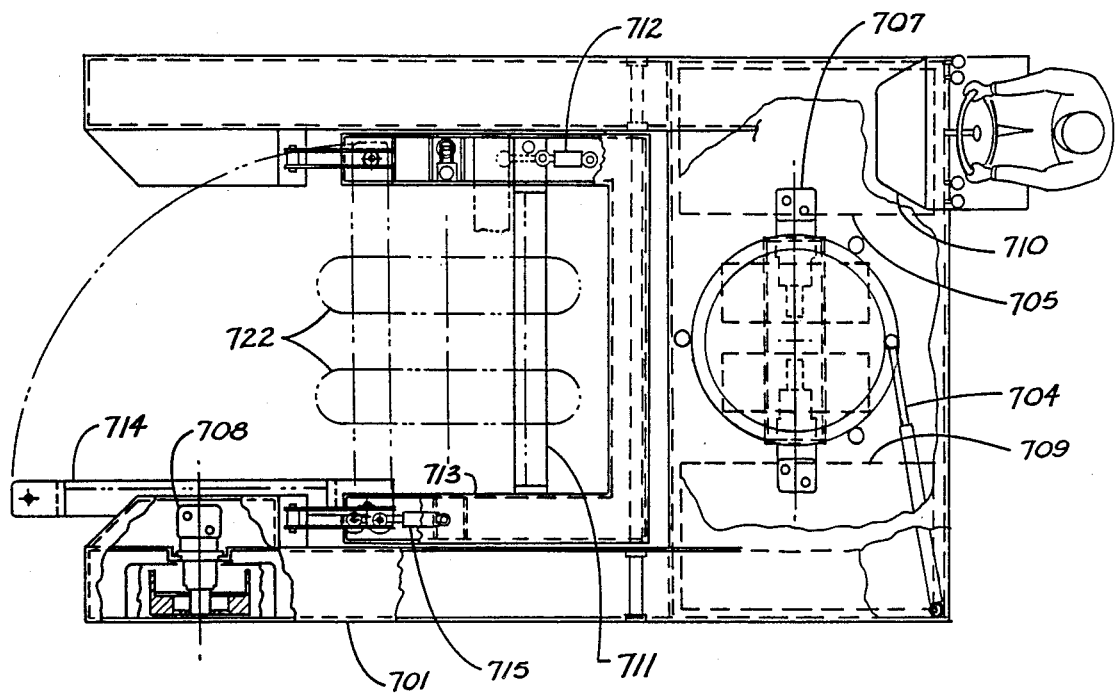
FIG. 7A shows a top view of an engineering multiview projection of a preferred embodiment of the instant invention mounted in an aircraft tug frame.
Figure 7B:
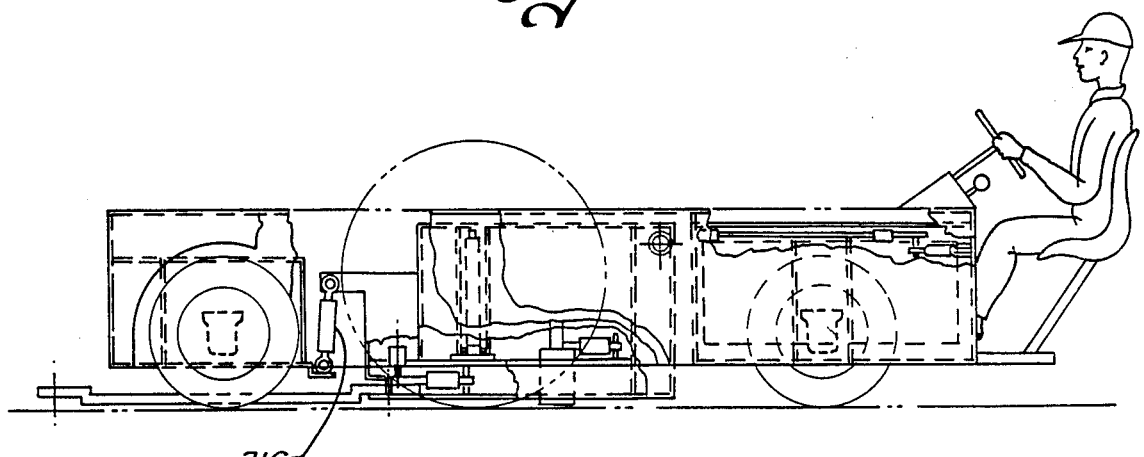
FIG. 7B is a side view of the same preferred embodiment of the instant invention as depicted in FIG. 7A.
Figure 7C:
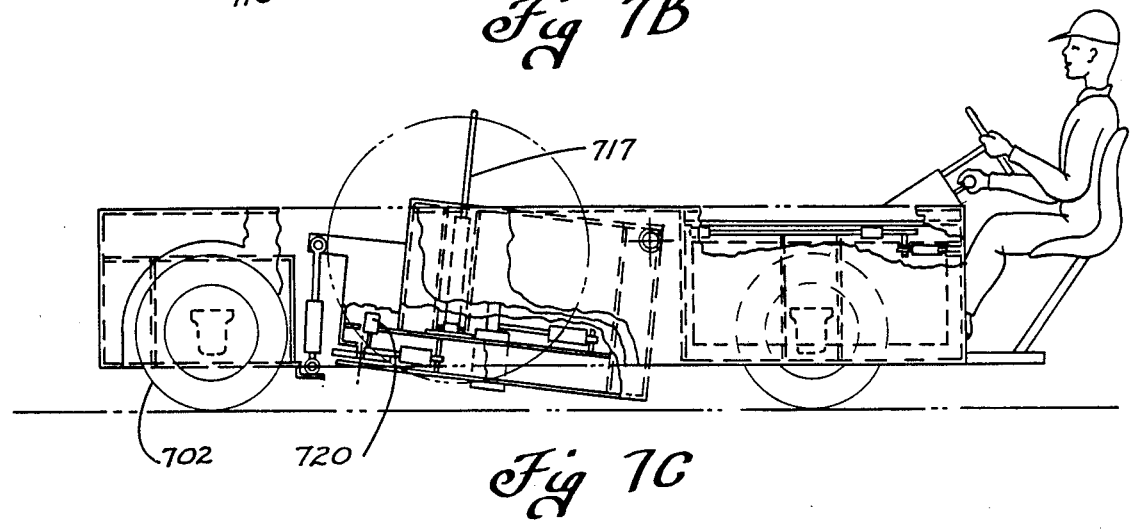
FIG. 7C shows another view according to the apparatus of FIG. 7B with the hydraulic lifting and capturing mechanisms fully actuated.

FIGS. 7A, 7B, and 7C combine to show an engineering multiview projection of an aircraft tug equipped with the apparatus of the instant invention. Shown are the tug frame 701 and wheels 702 along with hydraulic steering cylinder 704 and the preferred locations of the engine and hydraulic pump package 705 which provides adequate hydraulic pressure for the hydraulic drive motors 707 and 708 and for all the other hydraulic systems of the tug. The hydraulic valves, balancers, and other standard hydraulic equipment are contained in the hydraulic equipment package 709 as shown. The hydraulic controls and engine controls and steering wheel are located on the operator's control panel 710.

A preferred embodiment of the instant invention is also shown in FIGS. 7A, 7B, and 7C: adjustable crossbar 711; crossbar hydraulic actuators 712; lifting mechanism frame 713; capture arm 714; capture arm actuator 715; lifting mechanism actuators 716; dual hydraulic clamping mechanism 717, comprising both a positioner and an extender; and capture arm locking mechanism 720. These figures show a view of the dual clamping mechanism 717 in two positions: first, closed within its compartment, and second, positioned and extended to press against airplane tire 722. From these figures, and from the previous figures of the drawing, along with the above-written descriptions, one skilled in the mechanical arts can easily understand how to make and use a preferred embodiment of the instant invention.

While the invention has been explained and described with reference to details of preferred embodiments thereof, numerous variations thereof and modifications thereto will be readily apparent to those skilled in the mechanical arts without departing from the spirit and scope of the invention. Therefore, the invention is not restricted to the particular embodiments described above, but rather is limited only by the scope of the following claims.

What is claimed is:

1. In an aircraft tug, means for attaching said tug to a nosewheel of an airplane, the aircraft tug comprising, in combination:
   lifting means for raising the nosewheel of the airplane;
   universal nosewheel capturing means for receiving the nosewheel of the airplane along a longitudinal direction thereof, said universal nosewheel capturing means being provided with a transverse crossbar arranged transverse to said longitudinal direction of said lifting means, said transverse crossbar being displaceable along said longitudinal direction, and a pivotable capture arm, said universal nosewheel capturing means being connected to said lifting means; and,
   universal nosewheel clamping means for securing the nosewheel of the aircraft to said capturing means, said universal nosewheel clamping means being provided with positioner means for pivoting said universal nosewheel clamping means toward the nosewheel of the aircraft, and extender means for linearly extending said universal nosewheel clamping means.

2. The invention of claim 1, wherein there is further provided a longitudinal hydraulic actuator for displacing said transverse crossbar, said transverse crossbar being displaced along said longitudinal direction in response to actuation of said longitudinal hydraulic actuator.

3. The invention of claim 1, wherein there is further provided hydraulic capture arm actuator means for moving said pivotable capture arm.

4. The invention of claim 1, wherein there is further provided capture arm locking means for locking said pivotable capture arm.

5. The invention of claim 4, wherein said locking means is actuated by an electromechanical solenoid.

6. The invention of claim 1, wherein said positioner means and said extender means include respective positioner and extender hydraulic actuators.

7. A universal method for attaching an aircraft tug to an airplane, the method comprising the steps of:
   (a) capturing the nosewheel of the airplane with universal capturing means, the universal capturing means having a longitudinally adjustable crossbar for determining the location of the captured nosewheel of the airplane with respect to the aircraft tug, and a pivotable capture arm for preventing withdrawal of the captured nosewheel of the airplane, the universal nosewheel capturing means being connected to the aircraft tug;
   (b) lifting the nosewheel of the airplane with lifting means connected to the aircraft tug and the universal capturing means, so that the portion of the airplane's weight born by the nosewheel of the airplane is also born by the aircraft tug; and
   (c) clamping the nosewheel of the airplane with universal clamping means, said step of clamping including the further steps of positioning the universal clamping means in response to actuation of a positioner means, and extending at least a portion of the universal clamping means so as to be disposed in the vicinity of the top of the nosewheel of the airplane, in response to actuation of an extender means, the universal clamping means being connected to the aircraft tug, so that the nosewheel of the airplane is firmly pressed between the universal clamping means and the universal capturing means.

8. A U-shaped aircraft tug, including a four-wheel drive chassis and engine compartment, capable of capturing and moving, without adaptors, commercial and military aircraft at normal speeds on taxiways and parking ramps, in situations and environments that require precise maneuvering such as inside hangars and hangar bays of aircraft carriers, when under the sole control of one person, including universal means for attaching said tug to said aircraft, comprising in combination:

universal nosewheel capturing means comprising a longitudinally adjustable offset and bevelled crossbar and a horizontally pivotable offset and bevelled capture arm, including means for locking said capture arm in its closed position;

lifting means connected to said capturing means configured so as to form a box lifting frame mounted within said tug, pivoted at one end of said lifting means and mechanically raised by hydraulic lifters at the opposite end of said lifting means;

universal nosewheel clamping means being pivoted to said aircraft tug, including positioner means operably connected to said universal nosewheel clamping means to pivot it toward said nosewheel and extender means for linearly extending said universal nosewheel clamping means, for engaging and clamping the nosewheel of said aircraft firmly against said lifting means in such a manner so as not to interfere with or cause damage to said aircraft nosewheel doors or nosewheel struts or protuberances thereof.

9. The aircraft tug of claim 8, wherein said crossbar is longitudinally adjustable in response to the actuation of hydraulic actuators.

10. The aircraft tug of claim 8, wherein said capture arm is pivotally moved in response to actuation of a hydraulic actuator.

11. The aircraft tug of claim 8, wherein said locking means locks said capture arm in said closed position in response to actuation of an electromechanical solenoid.

12. The aircraft tug of claim 8, wherein said positioner and extender means are operated in response to actuation of respectively associated hydraulic actuators.

* * * * *